(12) United States Patent
Chiu et al.

(10) Patent No.: US 9,396,526 B2
(45) Date of Patent: Jul. 19, 2016

(54) METHOD FOR IMPROVING IMAGE QUALITY

(75) Inventors: Yi-Sheng Chiu, Taipei (TW); Shih-Chia Huang, Taipei (TW)

(73) Assignee: NATIONAL TAIPEI UNIVERSITY OF TECHNOLOGY, Taipei (TW)

( * ) Notice: Subject to any disclaimer, the term of this patent is extended or adjusted under 35 U.S.C. 154(b) by 1010 days.

(21) Appl. No.: 13/276,823

(22) Filed: Oct. 19, 2011

(65) Prior Publication Data
US 2013/0039577 A1 Feb. 14, 2013

(30) Foreign Application Priority Data

Aug. 10, 2011 (TW) .............................. 100128472 A (51) Int. Cl.
| | | |
|---|---|---|
| *G06T 5/00* | (2006.01) | |
| *G06K 9/46* | (2006.01) | |
| *G06T 5/40* | (2006.01) | |

(52) U.S. Cl.
CPC .............. *G06T 5/009* (2013.01); *G06K 9/4647* (2013.01); *G06T 5/40* (2013.01)

(58) Field of Classification Search
CPC ......... G06F 17/18; G06T 7/0087; G06T 5/40; G06T 17/18; G06T 7/0012; G06T 5/009
USPC .............................................. 382/168; 703/2
See application file for complete search history.

(56) References Cited

U.S. PATENT DOCUMENTS 6,130,724 A * 10/2000 Hwang ......................... 348/678
7,940,997 B2  5/2011 Han et al.

OTHER PUBLICATIONS

Huang et al., Efficient Contrast Enhancement Using Adaptive Gamma Correction With Weighting Distribution, Mar. 2013 [retrieved Dec. 1, 2015], IEEE Transactions on Image Processing, vol. 22 Issue:3, pp. 1032-1041. Retrieved from the Internet: http://ieeexplore.ieee.org/xpls/abs_all.jsp?arnumber=6336819&tag=1.*
Chiu et al., Efficient Contrast Enhancement Using Adaptive Gamma Correction and Cumulative Intensity Distribution, Oct. 9-12, 2011 [retrieved Dec. 1, 2015], 2011 IEEE International Conference on Systems, Man and Cybernetics, pp. 2946-2950. Retrieved from the Internet: http://ieeexplore.ieee.org/xpls/abs_all.jsp?arnumber=6084119.*

(Continued)

*Primary Examiner* — Matthew Bella
*Assistant Examiner* — Dennis Rosario
(74) *Attorney, Agent, or Firm* — Locke Lord LLP; Tim Tingkang Xia, Esq.

(57) ABSTRACT

A method for improving image quality for display device has steps of inputting an image; computing a probability density function based on the image; generating a first luminance histogram; computing a weighing distribution function based on the first luminance histogram; generating a second luminance histogram through pixel redistribution of the first luminance histogram; computing a cumulative density function based on the second luminance histogram; computing a gamma conversion function based on the cumulative density function based on the second luminance histogram; and adjusting luminance distribution of the input image based on the gamma conversion function.

9 Claims, 7 Drawing Sheets

(56) References Cited

OTHER PUBLICATIONS

Somasundaram et al., Medical Image Contrast Enhancement based on Gamma Correction, Jan.-Jun. 2011 [retrieved May 18, 2016], International Journal of Knowledge Management & e-Learning, vol. 3, No. 1, pp. 15-18. Retrieved from the Internet: http://serialsjournals.com/serialjournalmanager/pdf/1332238231.pdf.*

Yun et al., Image Enhancement using a Fusion Framework of Histogram Equalization and Laplacian Pyramid, Jan. 10, 2011 [retrieved May 18, 2016], IEEE Transactions on Consumer Electronics, vol. 56, Issue:4,pp. 2763-2771. Retrieved from the Internet: http://ieeexplore.ieee.org/xpls/abs_all.jsp?arnumber=5681167&tag=1.*

* cited by examiner

METHOD FOR IMPROVING IMAGE QUALITY

CROSS-REFERENCE TO RELATED APPLICATION

This non-provisional application claims priority under 35 U.S.C. §119(a) on Patent Application No. 100128472 filed in Taiwan R.O.C. on Aug. 10, 2011, the entire contents of which are hereby incorporated by reference.

FIELD OF THE INVENTION

The present invention is a method for improving image quality for a display device. Specifically, the method is an efficient histogram modification method for contrast enhancement, which plays a significant role in digital image processing, computer vision, pattern recognition and an automatic transformation technique to improve the brightness of dimmed images based on the gamma correction and probability distribution of the luminance pixel.

BACKGROUND OF THE INVENTION

Contrast enhancement plays an important role in the improvement of visual quality for computer vision, pattern recognition, and the processing of digital images.

Generally, traditional histogram equalization (THE) can be used to enhance the image contrast by using probability density function (PDF). However, the above method uses the entirety of the information of the histogram, so it is impossible to maintain the brightness of the original image.

To solve the shortcoming of the traditional histogram equalization, variable methods which based on the traditional histogram equalization are proposed to maintain the brightness of the primary image. Most of these methods are accomplished by histogram segmentation. Nevertheless, these methods are prone to produce distortions of the local features.

Typically, a conventional gamma correction method may rapidly enhance image contrast by adjusting the gamma variables in the function. However, gamma correction cannot provide dynamic adjustment of image contrast enhance to every dimmed image. In order to solve the shortcoming, a method called dynamic contrast ratio gamma correction (DCRGC) combines histogram normalization and reverse-gamma correction is proposed to cope with the dynamic contrast enhancement problem. Unfortunately, this method still cannot automatically obtain contrast enhancement from variable controls.

SUMMARY OF THE INVENTION

The objective of the present invention is to provide a method for improving image quality.

The present invention is a method for improving image quality for a display device.

The method for improving image quality for a display device comprises steps of inputting an image; computing a probability density function based on the image; generating a first luminance histogram; computing a weighing distribution function based on the first luminance histogram; generating a second luminance histogram through pixel redistribution of the first luminance histogram; computing a cumulative density function based on the second luminance histogram; computing a gamma conversion function based on the cumulative density function based on the second luminance histogram; and adjusting luminance distribution of the input image based on the gamma conversion function.

The present invention is to provide an efficient histogram modification method for contrast enhancement to improve image quality for a display device and an automatic transformation technique to improve the brightness of dimmed images.

DETAILED DESCRIPTION OF THE PRESENT INVENTION

In general, cumulative density function (CDF) can be used to enhance pixel intensity, but the image brightness may be distorted. On the other hand, the conventional gamma correction method uses a constant power function with exponent γ for the image enhancement. Therefore, the major challenge is how to automatically determine the parameter γ.

Inspired by the probability and statistical inference, it is possible to determine the parameter γ based on probability density function (PDF) and cumulative density function (CDF). Hence, the equation can be reasonably modified by combining the cumulative density function (CDF) curve. The proposed gamma transformation equation can be defined as follows:

$$T(l) = 255\left(\frac{l}{255}\right)^{1-CDF(l)}$$

where l=lmin, lmin+1, lmin+2, . . . , lmax. Unfortunately, the CDF curve of the dimmed image experiences significant fluctuations due to environmental situations. As a result, unfavorable artifacts may be generated by equation.

Figure 1:
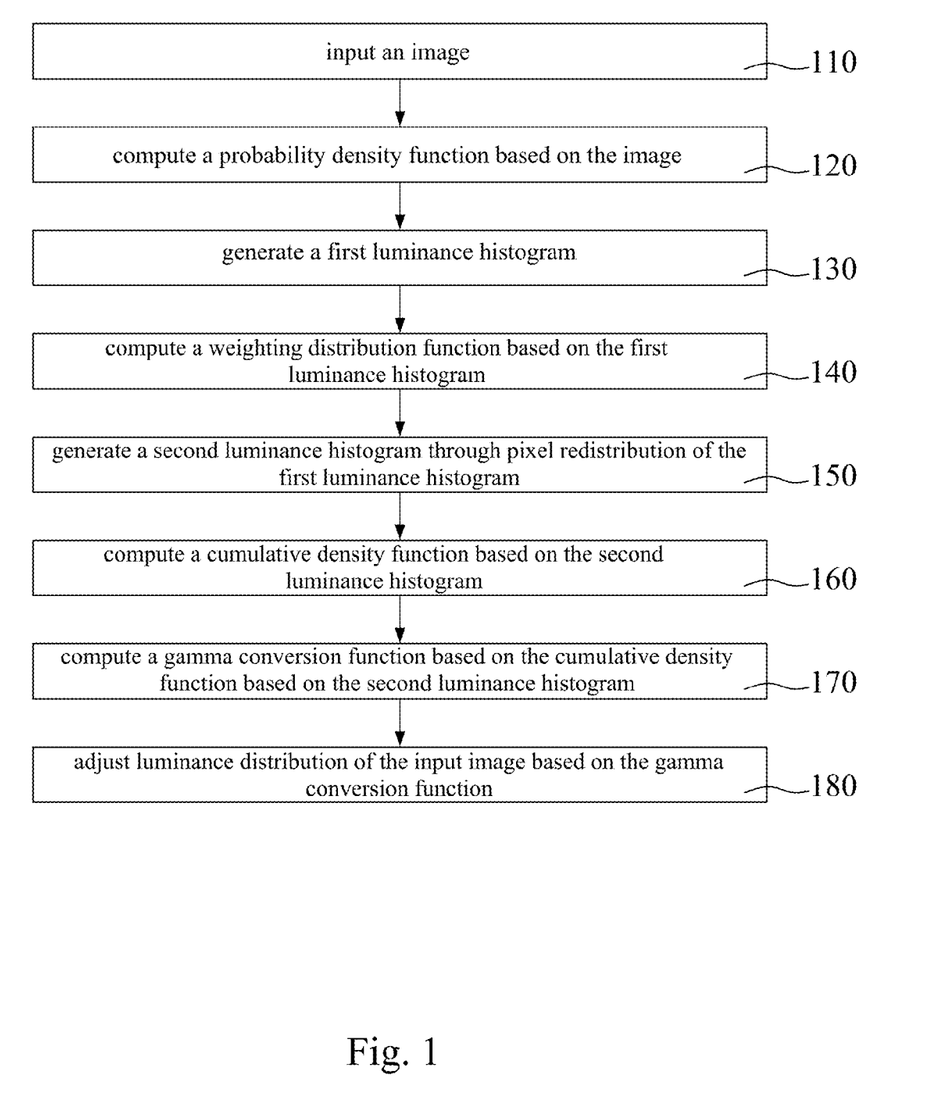
FIG. 1 is a flow chart of a first embodiment of a method for improving image quality for display device in accordance with the present invention.

In order to solve these problems, with reference to FIG. 1, a first embodiment of a method for improving image quality in accordance with the present invention comprises a step (110) of inputting an image; a step (120) of computing a probability density function based on the image; a step (130) of generating a first luminance histogram; a step (140) of computing a weighing distribution function based on the first luminance histogram; a step (150) of generating a second luminance histogram through pixel redistribution of the first luminance histogram; a step (160) of computing a cumulative density function based on the second luminance histogram; a step (170) of computing a gamma conversion function based on the cumulative density function based on the second luminance histogram; and a step (180) of adjusting luminance distribution of the input image based on the gamma conversion function.

In the step (110) of inputting an image, the image is a color image and further comprises a step of obtaining a luminance histogram based on the image.

In the steps (120) and (130) of computing a probability density function based on the image, generating a first luminance histogram. The probability density function calculated based on the image and further comprises a step of computing the probability density function based on the luminance histogram. The first luminance histogram generated based on the probability density function.

In the steps (140) and (150) of computing a weighing distribution function based on the first luminance histogram, generating a-second luminance histogram through pixel redistribution of the first luminance histogram. The present invention uses the weighing distribution function to smooth the fluctuant phenomenon. The weighing distribution function can be expressed as follows:

$$PDFw(l) = \max(PDF)\left(\frac{PDF(l) - \min(PDF)}{\max(PDF) - \min(PDF)}\right)^\alpha$$

where l=lmin, lmin+1, lmin+2, ... , lmax. PDFw(l) represents the weighing probability density, max(PDF) represents the maximum probability density, min(PDF) represents the minimum probability density, and α represents the adaptive parameter that can be experimentally set to 0.5.

The second luminance histogram is generated through pixel redistribution of the first luminance histogram.

In the step (160) of computing a cumulative density function based on the second luminance histogram. The original cumulative density function is smoothed and can be expressed as follows:

$$CDFs(l) = \sum_{h=0}^{l} \frac{PDFw(h)}{\Sigma PDFw}$$

where l=lmin, lmin+1, lmin+2, ... , lmax. ΣPDFw represents the sum of the weighing probabilities, and CDFs(l) represents the smoothed cumulative density function.

In the steps (170) and (180) of computing a gamma conversion function based on the cumulative density function based on the second luminance histogram, adjusting luminance distribution of the input image based on the gamma conversion function. The gamma transformation equation can be modified and expressed as the gamma conversion function as follows:

$$T(l) = 255\left(\frac{l}{255}\right)^{1-CDFs(l)}$$

Figure 2:
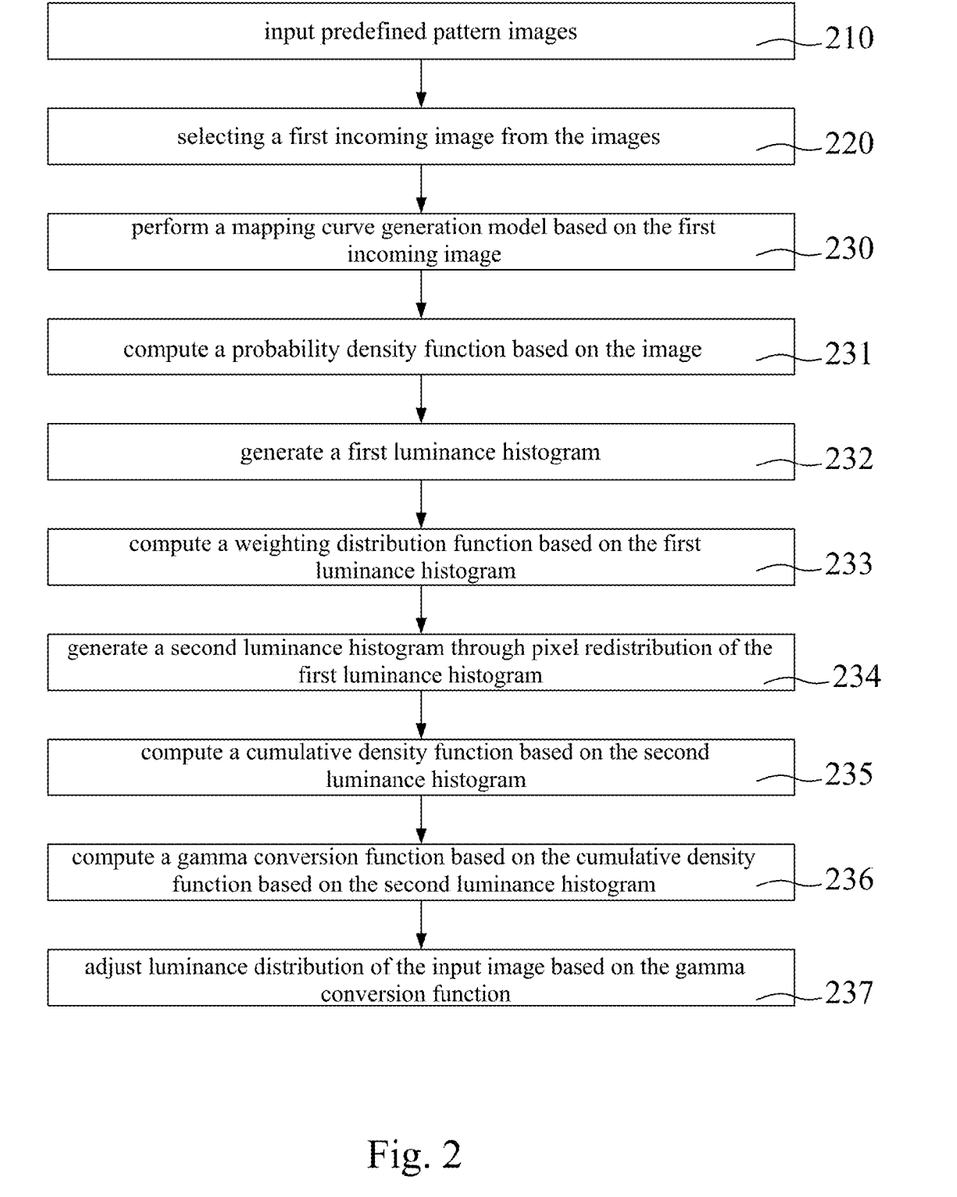
FIG. 2 is a flow chart of a second embodiment of a method for improving image quality for display device in accordance with the present invention.

With reference to FIG. 2, a second embodiment of a method for improving image quality for a display device in accordance with the present invention comprises a step (210) of inputting predefined pattern images; a step (220) of selecting a first incoming image from the images; and a step (230) of performing a mapping curve generation model based on the first incoming image.

The step (230) of performing a mapping curve generation model based on the first incoming image comprises a step (231) of computing a probability density function based on the image; a step (232) of generating a first luminance histogram; a step (233) of computing a weighing distribution function based on the first luminance histogram; a step (234) of generating a second luminance histogram through pixel redistribution of the first luminance histogram; a step (235) of computing a cumulative density function based on the second luminance histogram; a step (236) of computing a gamma conversion function based on the cumulative density function based on the second luminance histogram; and a step (237) of adjusting luminance distribution of the input image based on the gamma conversion function.

In the step (210) of inputting predefined pattern images, the predefined pattern images are video images.

In the step (220) of selecting a first incoming image from the images, the first incoming image selected from the first order in the list comprises a step of storing the first incoming image.

In the step (230) of performing a mapping curve generation model based on the first incoming image, the mapping curve generation model performed based on the first incoming image. The mapping curve generation model is the same as the first embodiment of the steps (120) to (180).

For the contrast enhancement of the video sequences, the computational time can be further reduced by using the temporal information between each image. Therefore, the present invention additionally proposes a temporal-based technique to reduce the computational complexity while applying our proposed image enhancement method.

Figure 3:
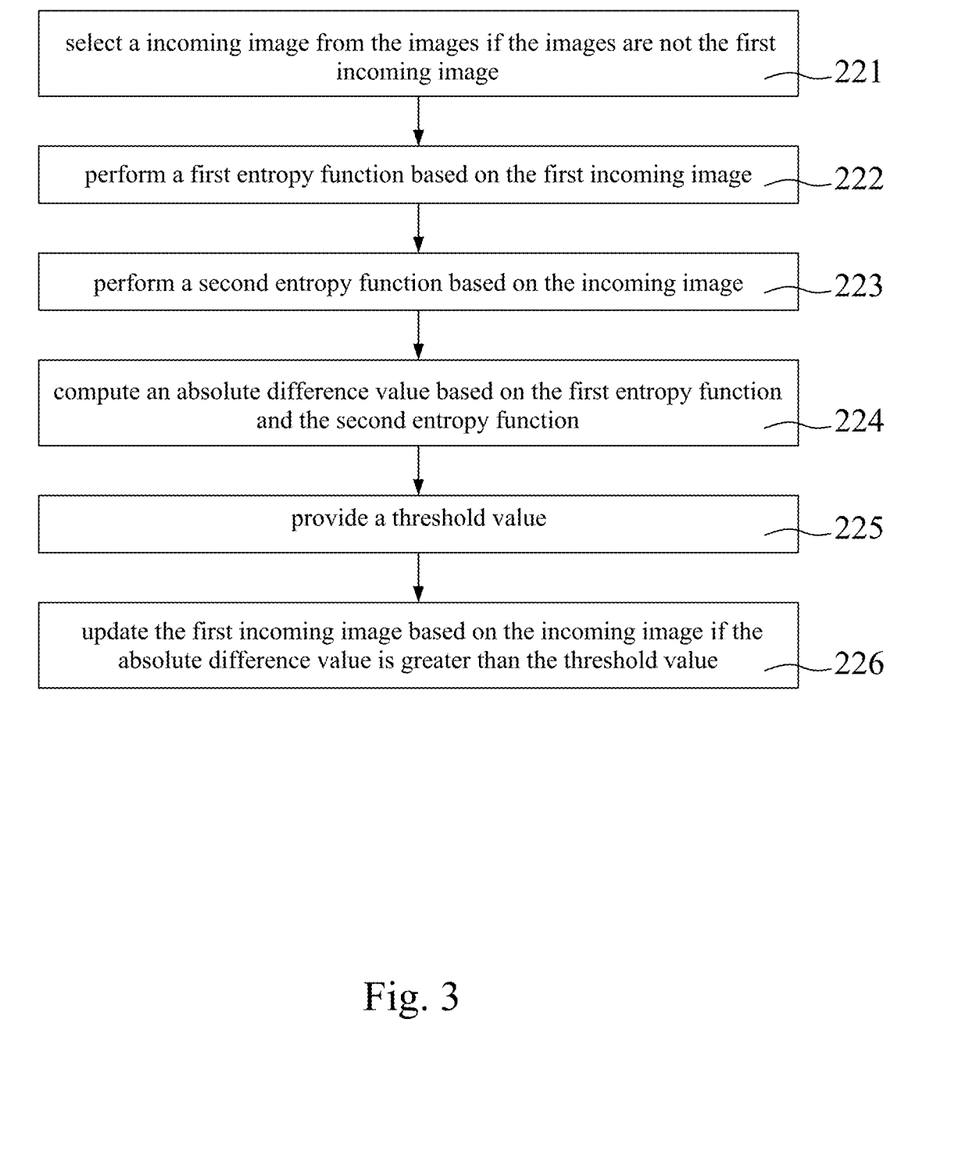
FIG. 3 is a flow chart of a second embodiment of a method for improving image quality for display device in accordance with the present invention.

With reference to FIG. 3, in the step (220) of selecting a first incoming image from the images comprises a step (221) of selecting a incoming image from the images if the images are not the first incoming image; a step (222) of performing a first entropy function based on the first incoming image; a step (223) of performing a second entropy function based on the incoming image; a step (224) of computing an absolute difference value based on the first entropy function and the second entropy function; a step (225) of providing a threshold value; and a step (226) of updating the first incoming image based on the incoming image if the absolute difference value is greater than the threshold value.

In the step (221) of if the images are not the first incoming image, selecting a incoming image from the images. The incoming image may be the second, third or fourth, etc. of the images.

In the step (222) of performing a first entropy function based on the first incoming image comprises computing a first probability density function based on the first incoming image; and computing a first entropy function based on the first probability density function. In general, the information content of the first incoming image can be directly quantified by the first entropy function. Based on probability density function, the first entropy function H can be defined as follows:

$$H(l) = -\sum_{l=0}^{255} PDF(l) \log_2 PDF(l)$$

In the step (223) of performing a second entropy function based on the incoming image comprises computing a second probability density function based on the incoming image; and computing a second entropy function based on the second probability density function. The information content of the incoming image can be directly quantified by the second entropy function. Based on probability density function, the second entropy function H can be defined as follows:

$$H(l) = -\sum_{l=0}^{255} PDF(l) \log_2 PDF(l)$$

In the steps (224) and (225) of computing an absolute difference value based on the first entropy function and the second entropy function, providing a threshold value, in order to reduce the computational time, the present invention avoids the re-computation of the mapping curve generation model. According to the first entropy function and the second entropy function, the difference of the information content between the first entropy function and the second entropy function can be estimated through the absolute difference value.

The threshold value is a preset value.

In the step (226) of if the absolute difference value is greater than the threshold value, the first incoming image should be updated by the incoming image, thus the mapping curve generation model should be modified using the incoming frame.

Figure 4:
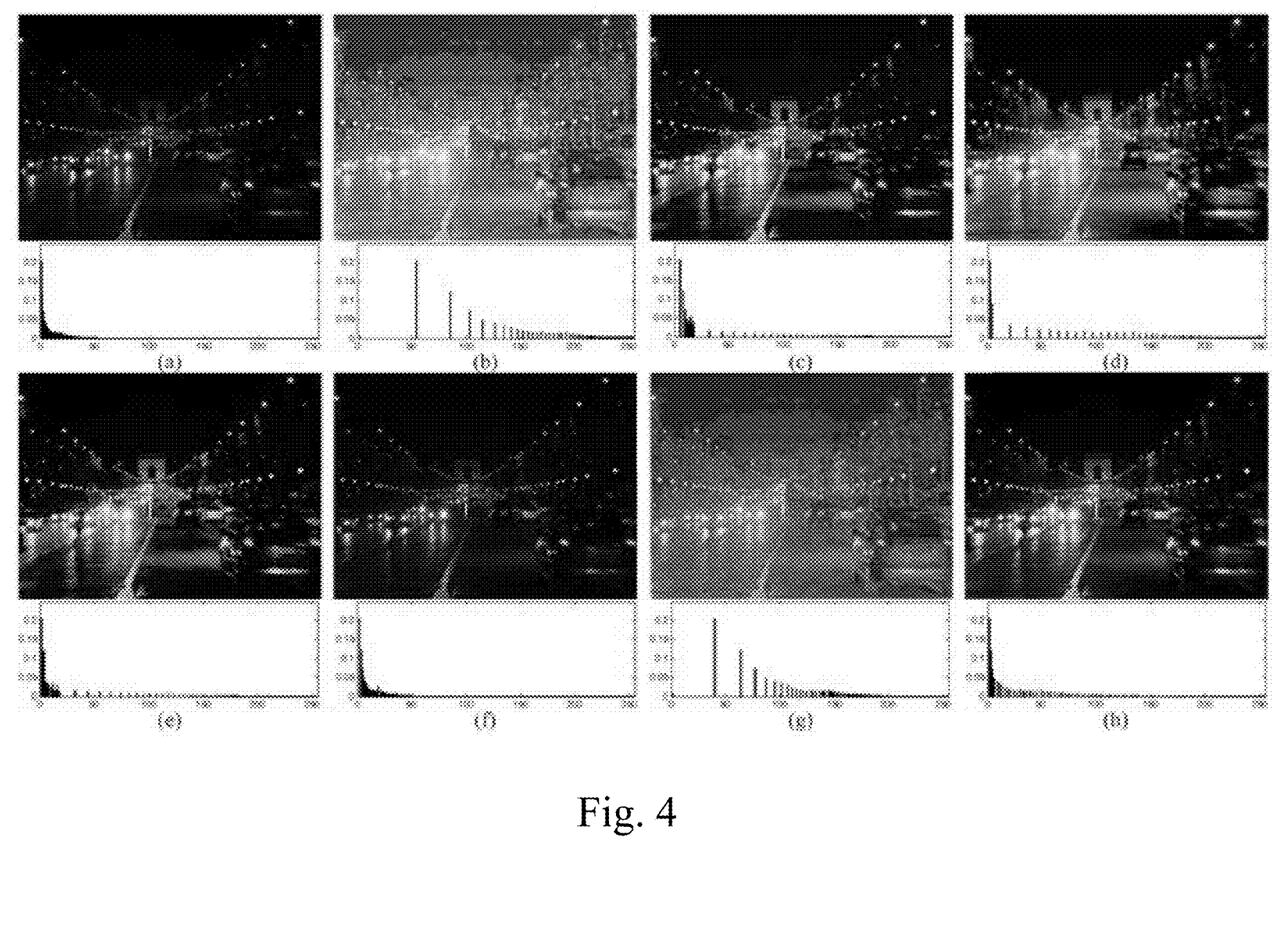
FIGS. 4 to 7 are diagrams illustrating improve results of contrast according to first embodiments of the present invention, as compared with the related art.
Figure 5:
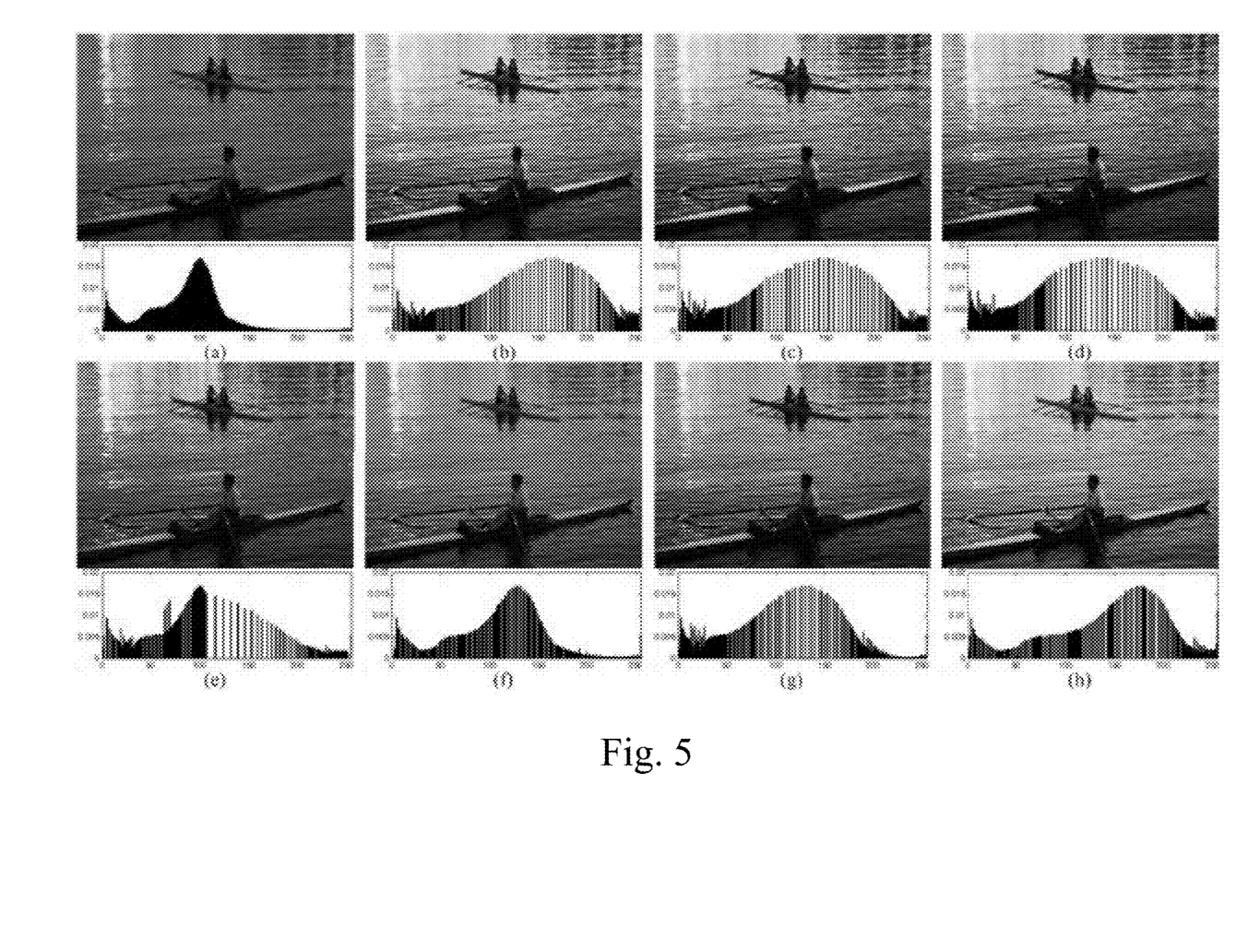
Figure 6:
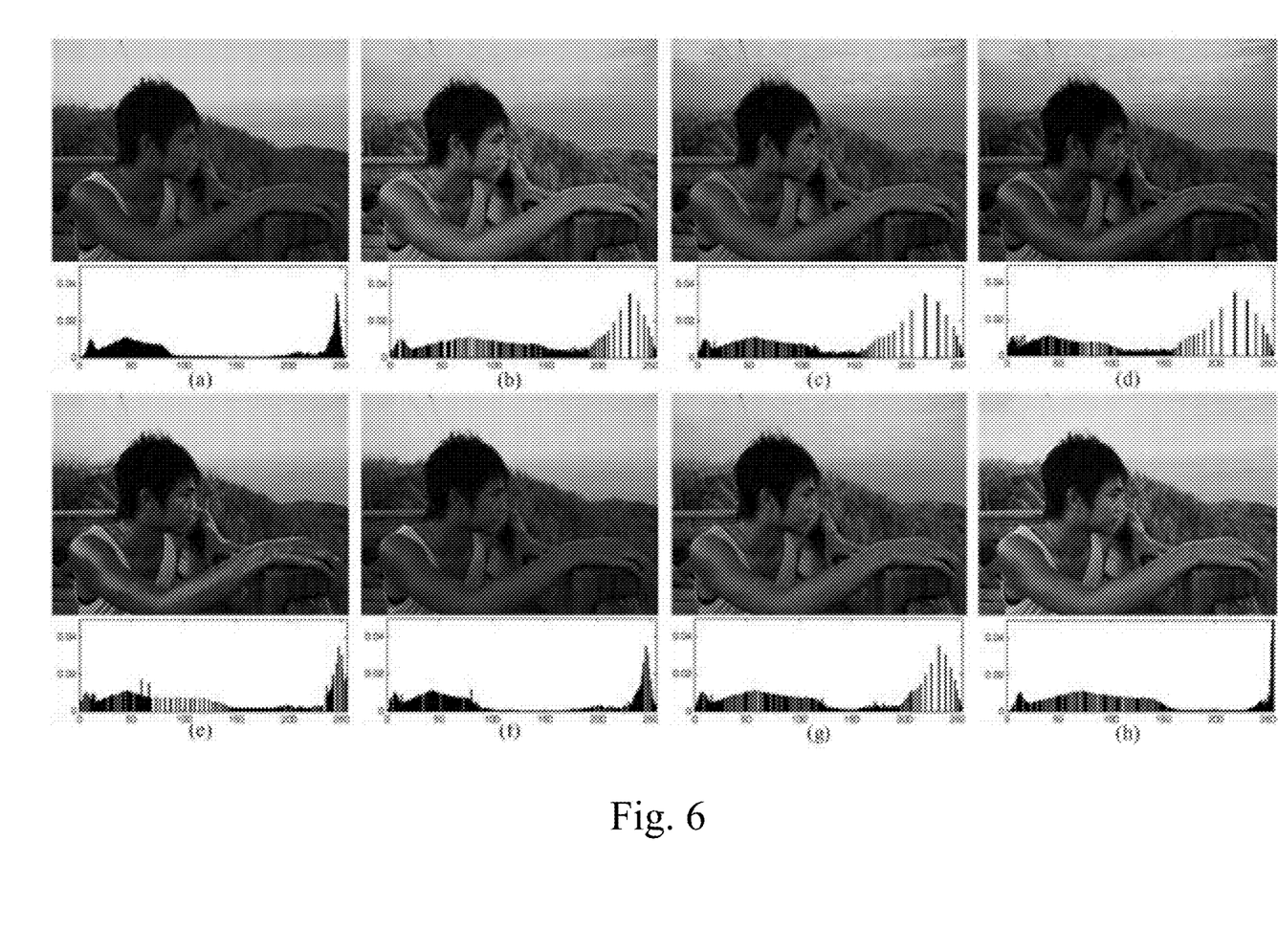
Figure 7:
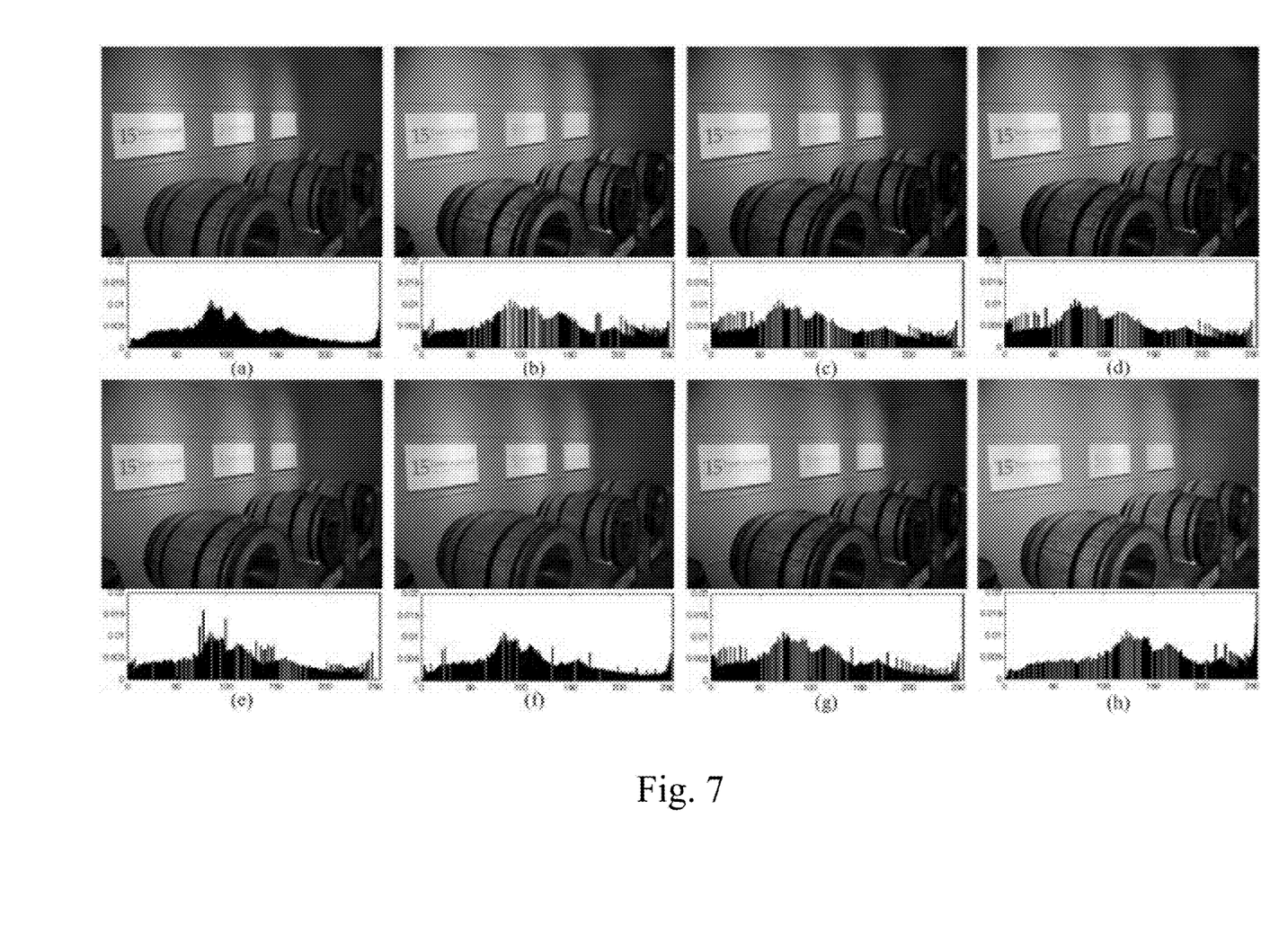

With reference to FIGS. 4 to 6, what shows are diagrams illustrating improve results of contrast according to first embodiments of the present invention, as compared with the related art.

Figures in order: (a) original image; (b) Traditional Histogram Equalization, THE; (c) Brightness Preserving Bi-Histogram Equalization, BBHE; (d) Dualistic Sub-Image Histogram Equalization, DSIHE; (e) Recursive Sub-Image Histogram Equalization, RSIHE; (f) Recursively Separated and Weighted Histogram Equalization, RSWHE; (g) Dynamic Contrast Ratio Gamma Correction, DCRGC; and (h) the first embodiments of the present invention.

This section presents the experimental results for the enhancement of dimmed images. In demonstration of the contribution of this paper, six previous state-of-the-art methods in addition to the proposed method were tested for a variety of natural color images. The test images were broadly obtained in both outdoor and indoor environment.

For outdoor environment, illumination changes may occur in the captured scene due to many factors including the gradual change in the location of the sun, or a sudden switch to dark or cloudy conditions. Conversely, illumination changes presented by indoor environment are relatively simple due to low variation in lighting conditions. In both cases, the details and colors may not be readily discernable to the human eye.

For the input dimmed image, most of the pixels are densely distributed in the low-level region. Based on the weighing distribution function, the fluctuant phenomenon can be smoothened, which reduces the over-enhancement of the gamma correction.

Note that the present invention is the first group to attain color image enhancement through combination of the CDF, the weighing distribution, and the gamma correction. As a result, it is easily observed that the method can enhance the color image with neither generation of additional artifacts nor distortion of color.

What is claimed is:

1. A method for improving image quality, comprising steps of:
   inputting an image to any generic computer;
   computing a probability density function based on the image to generate a first luminance histogram;
   computing a weighing distribution function based on the first luminance histogram to generate a second luminance histogram through pixel redistribution of the first luminance histogram, wherein the weighing distribution function is defined as follows:

$$PDF_w(l) = \max(PDF)\left(\frac{PDF(l) - \min(PDF)}{\max(PDF) - \min(PDF)}\right)^\alpha$$

where l represents pixel of the image, l=lmin, lmin+1, lmin+2, ..., lmax, PDFw(l) represents weighing probability density, max(PDF) represents maximum probability density, min(PDF) represents minimum probability density, and α represents an adaptive parameter that can be experimentally set to 0.5, the PDF(l) represents probability density function of l;

computing a cumulative density function based on the second luminance histogram, wherein the cumulative density function is defined as follows:

$$CDF_s(l) = \sum_{h=0}^{l} \frac{PDF_w(h)}{\Sigma PDF_w},$$

where l=lmin, lmin+1, lmin+2, ..., lmax, ΣPDFw represents a sum of weighing probabilities, and CDFs(l) represents cumulative density function; and computing a gamma conversion function based on the cumulative density function to adjust luminance distribution of the input image, wherein the gamma conversion function is defined as follows:

$$T(l) = 255\left(\frac{l}{255}\right)^{1-CDF_S(l)}.$$

2. The method as claimed in claim 1, wherein the step of inputting the image further comprises a step of:
   obtaining a luminance histogram based on the image.

3. The method as claimed in claim 2, wherein the step of computing the probability density function based on the image further comprises a step of:
   computing the probability density function based on the luminance histogram.

4. A method for improving image quality, the method comprising steps of:
   inputting predefined pattern images to any generic computer;
   selecting a first incoming image from the images; and
   performing a mapping curve generation modelling based on the first incoming image comprising:
      computing a probability density function based on the first incoming image to generating a first luminance histogram;
      computing a weighing distribution function based on the first luminance histogram to generate a second luminance histogram through pixel redistribution of the first luminance histogram, wherein the weighing distribution function is defined as follows:

$$PDF_w(l) = \max(PDF)\left(\frac{PDF(l) - \min(PDF)}{\max(PDF) - \min(PDF)}\right)^\alpha$$

where l represents pixel of the image, l=lmin, lmin+1, lmin+2, . . . , lmax, PDFw(l) represents weighing probability density, max(PDF) represents maximum probability density, min(PDF) represents minimum probability density, and α represents an adaptive parameter that can be experimentally set to 0.5, the PDF(l) represents probability density function of l;

computing a cumulative density function based on the second luminance histogram, wherein the cumulative density function is defined as follows:

$$CDF_s(l) = \sum_{h=0}^{l} \frac{PDF_w(h)}{\sum PDF_w},$$

where l=lmin, lmin+1, lmin+2, . . . , lmax, ΣPDFw represents a sum of weighing probabilities, and CDFs(l) represents cumulative density function; and computing a gamma conversion function based on the cumulative density function to adjust luminance distribution of the input image, wherein the gamma conversion function is defined as follows:

$$T(l) = 255 \left(\frac{l}{255}\right)^{1-CDF_S(l)};$$

and performing a first entropy function based on the first incoming image, wherein the first entropy function is defined as follows:

$$H(l) = -\sum_{l=0}^{255} PDF(l)\log_2 PDF(l).$$

5. The method as claimed in claim 4, wherein the step of selecting the first incoming image from the images further comprises step of:
obtaining a luminance histogram based on the first incoming image.

6. The method as claimed in claim 5, wherein the step of computing the probability density function based on the first incoming image further comprises step of:
computing the probability density function based on the luminance histogram.

7. The method as claimed in claim 4, wherein the step of selecting the first incoming image from the images further comprises:
storing the first incoming image.

8. The method as claimed in claim 4, wherein after the step of performing a first entropy function based on the first incoming image, the method further comprises:
selecting an incoming image from the images if the images are not the first incoming image;
performing a second entropy function based on the incoming image, wherein the second entropy function is defined as follows:

$$H(l) = -\sum_{l=0}^{255} PDF(l)\log_2 PDF(l)$$

computing an absolute difference value based on the first entropy function and the second entropy function;
providing a threshold value; and
updating the first incoming image based on the incoming image if the absolute difference value is greater than the threshold value.

9. The method as claimed in claim 8, wherein the step of performing the first entropy function based on the first incoming image comprises steps of:
computing a first probability density function based on the first incoming image; and
computing a first entropy function based on the first probability density function; and
wherein the step of performing the second entropy function based on the incoming image comprises steps of:
computing a second probability density function based on the incoming image; and
computing a second entropy function based on the second probability density function.

* * * * *